No. 824,979. PATENTED JULY 3, 1906.
W. T. DEAN & J. G. BERGQUIST.
AUTOMATIC ELECTRIC WEIGHING MACHINE.
APPLICATION FILED NOV. 15, 1905.

5 SHEETS—SHEET 3.

Witnesses,
J. S. Mann,
Walter M. Fuller

Inventors,
William T. Dean &
John G. Bergquist
By Offield, Towle & Linthicum
Atty's.

No. 824,979. PATENTED JULY 3, 1906.
W. T. DEAN & J. G. BERGQUIST.
AUTOMATIC ELECTRIC WEIGHING MACHINE.
APPLICATION FILED NOV. 15, 1905.

5 SHEETS—SHEET 4.

No. 824,979. PATENTED JULY 3, 1906.
W. T. DEAN & J. G. BERGQUIST.
AUTOMATIC ELECTRIC WEIGHING MACHINE.
APPLICATION FILED NOV. 15, 1905.

5 SHEETS—SHEET 5.

Witnesses,
Inventors,
William T. Dean
John G. Bergquist
By Offield, Towle & Linthicum
Atty's.

UNITED STATES PATENT OFFICE.

WILLIAM T. DEAN AND JOHN G. BERGQUIST, OF CHICAGO, ILLINOIS.

AUTOMATIC ELECTRIC WEIGHING-MACHINE.

No. 824,979.  Specification of Letters Patent.  Patented July 3, 1906.

Application filed November 15, 1905. Serial No. 287,514.

*To all whom it may concern:*

Be it known that we, WILLIAM T. DEAN and JOHN G. BERGQUIST, citizens of the United States, residing at Chicago, in the county of Cook and State of Illinois, have invented certain new and useful Improvements in Automatic Electric Weighing-Machines, of which the following is a specification.

Our invention relates to an apparatus for automatically weighing predetermined amounts of any material; but it pertains particularly to scales for automatically and separately weighing the ingredients of a compound and simultaneously discharging the same into a common receptacle.

The general object of our invention is to do away with the element of error which frequently arises through the purely manual weighing of the ingredients of compound substances, such as cement, which require accurate and uniform proportions of such ingredients in order to secure uniform excellence of quality and character of the resulting compound. In pursuance of this object we have devised an apparatus including scale-hoppers, feeding devices therefor, and a common receptacle receiving the charges of ingredients delivered by said scale-hoppers, together with electrically-controlled appliances for governing the feeding and delivering devices of the apparatus in such a manner as to insure the accurate weighing out and mixing of predetermined quantities of the ingredients in an entirely automatic manner and without dependence upon the attention and skill, or lack of these qualities, of the attendant or operator.

Figure 1:
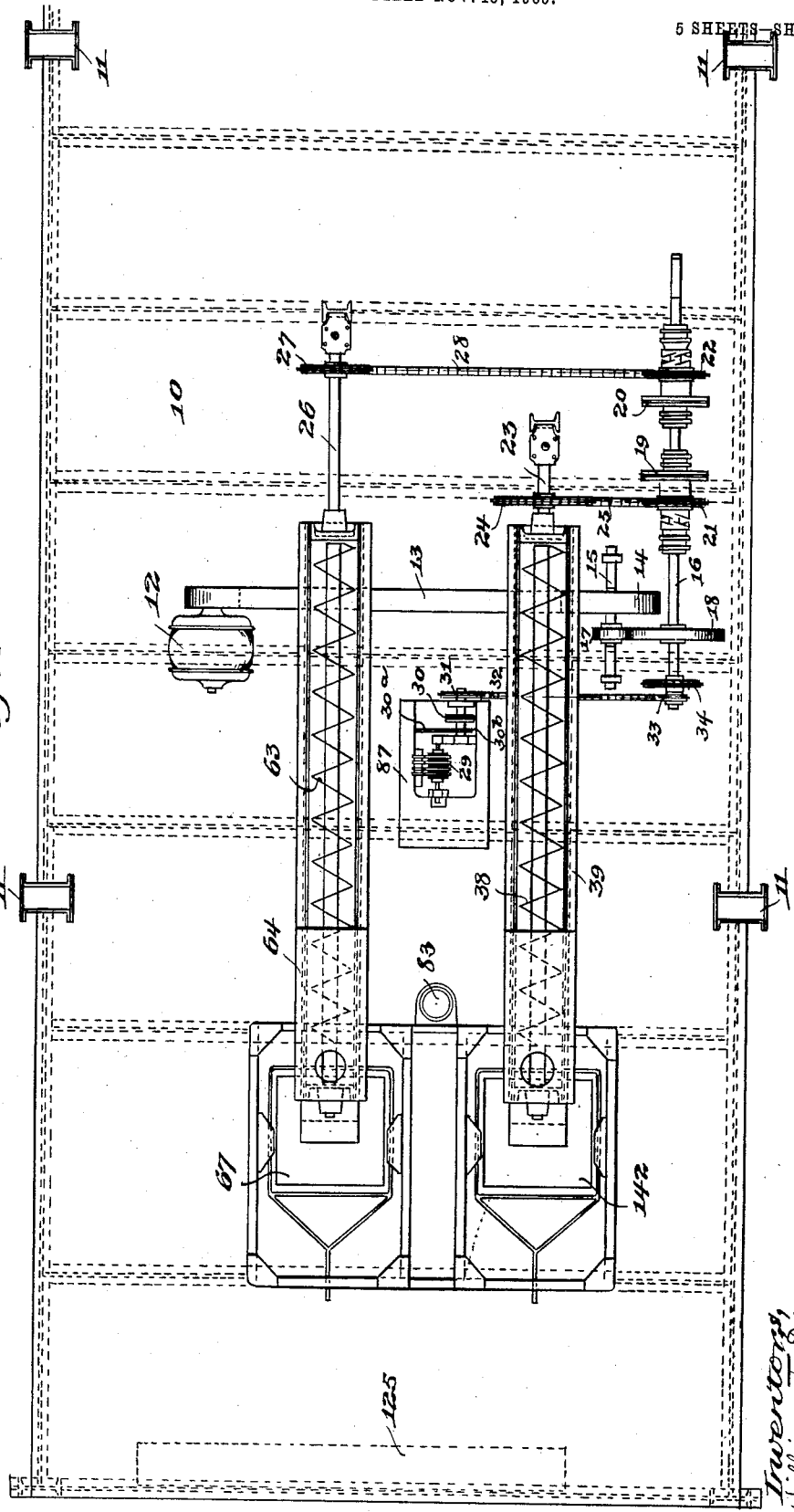
Figure 2:
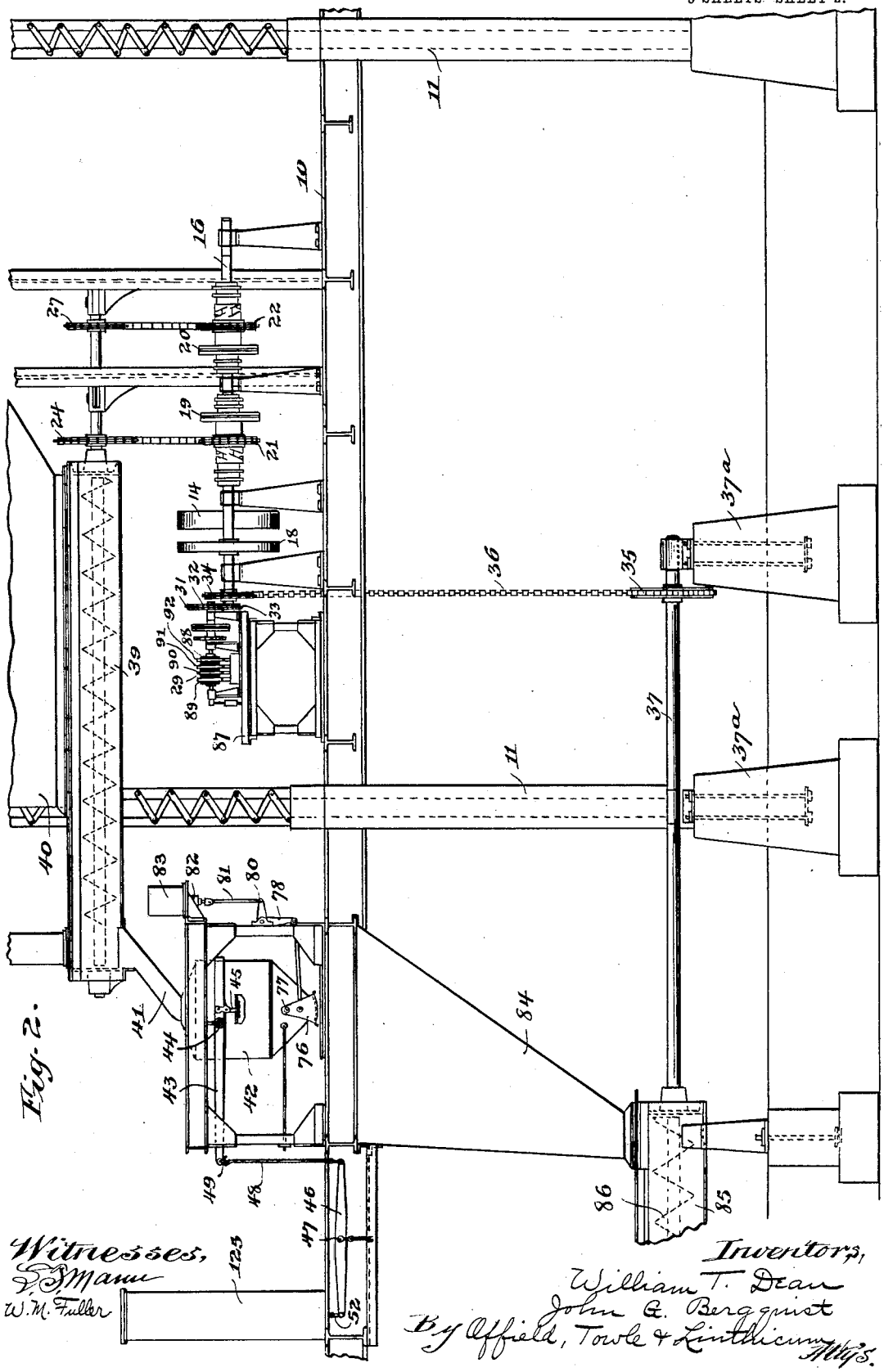
Figure 3:
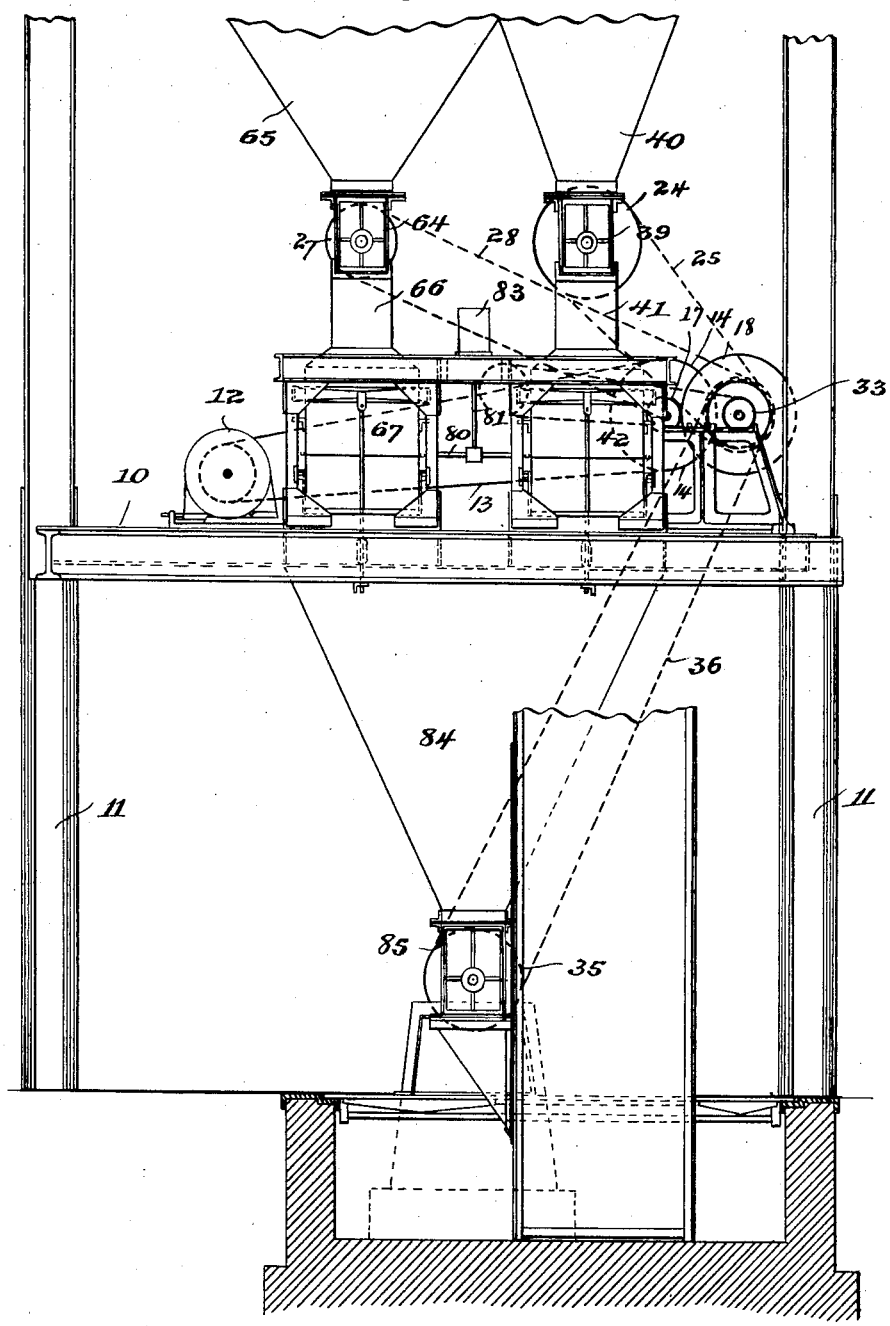
Figure 4:
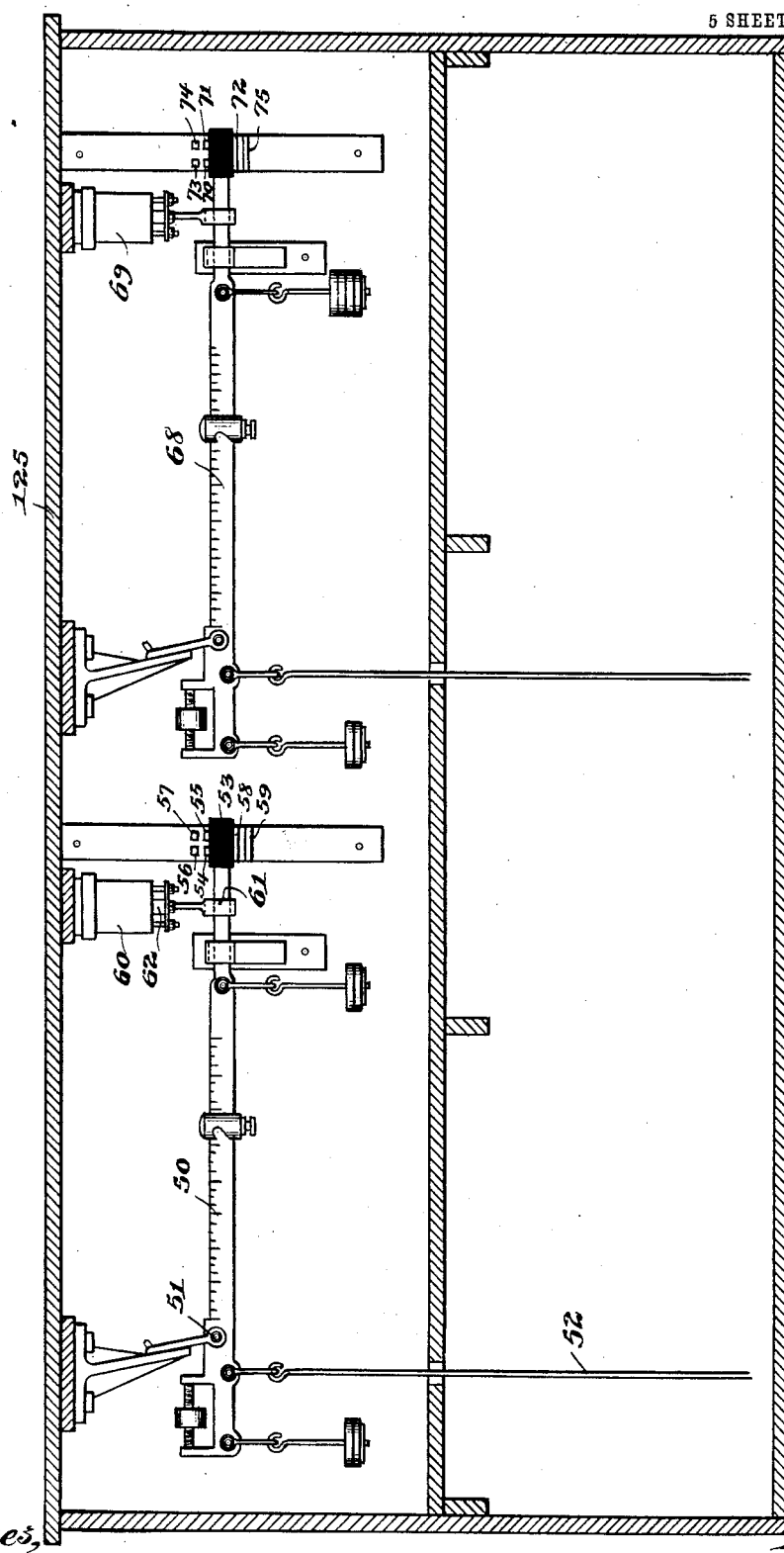
Figure 5:
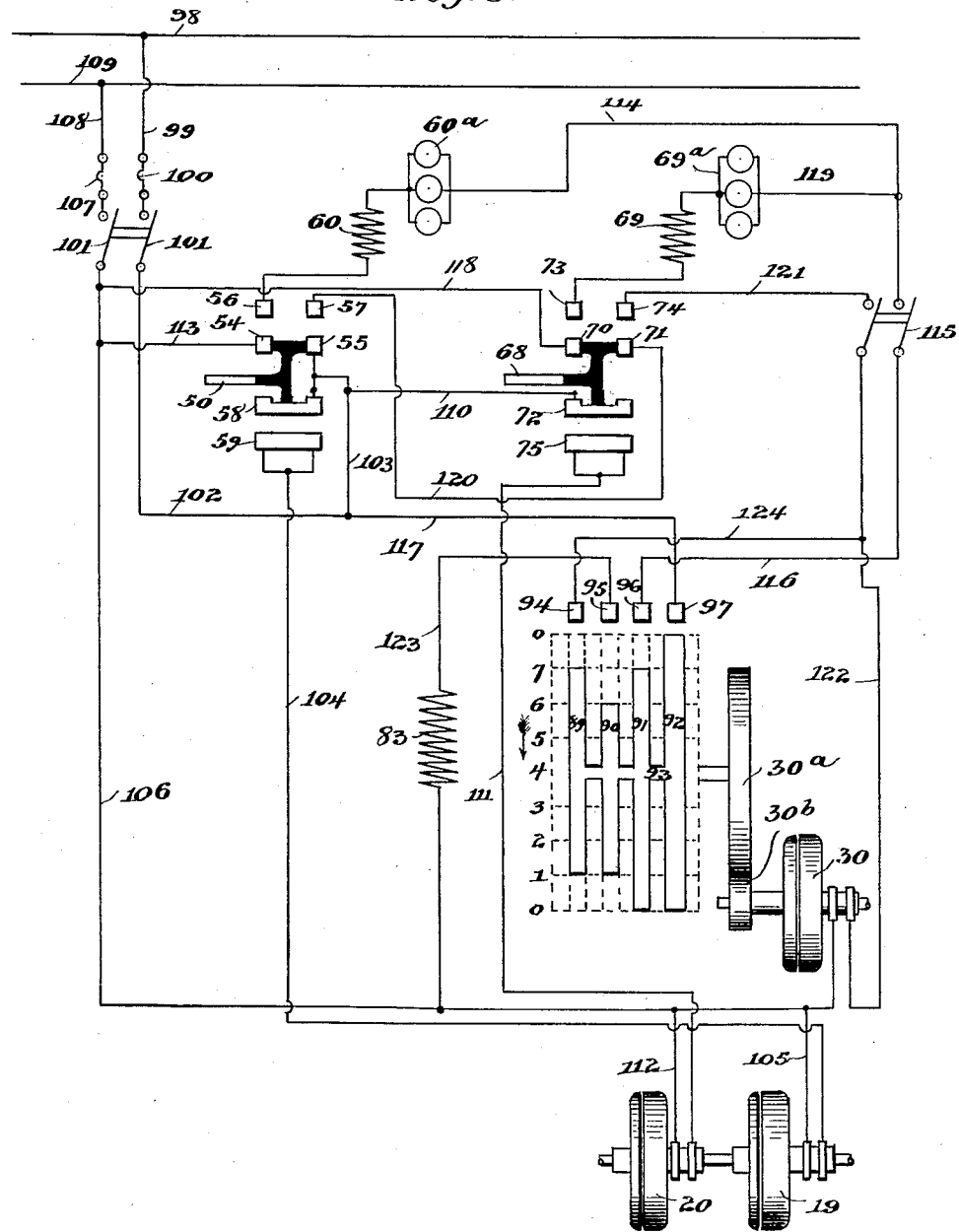

In the drawings, which accompany this specification and which illustrate the preferred mechanical embodiment of our invention, Figure 1 is a plan view of an automatic mechanism for weighing the constituents of a compound including two ingredients. Fig. 2 is a side elevation of the same mechanism. Fig. 3 is an end elevation of the same. Fig. 4 is an enlarged detail view of the scale-beams and their inclosing casing, and Fig. 5 is a diagram of the electric circuits.

Suitably mounted on a platform 10, supported by vertical posts 11, is an electric motor 12, connected, by means of a belt 13, to a pulley 14 on a jack-shaft 15, the rotation of the latter being transmitted to a shaft 16 by friction drive-pulleys 17 and 18. Shaft 16 has two electromagnetic clutches 19 and 20, supplied with sprocket-wheels 21 and 22, respectively, the former being connected to a shaft 23 through a sprocket-wheel 24 and chain 25, the latter being similarly connected to a shaft 26 by means of a sprocket-wheel 27 and chain 28. An electric controller 29 is rotated by a sprocket-wheel 31 and chain 32, which encircles a sprocket-wheel 33 on shaft 16, an electromagnetic clutch 30 and friction drive-pulleys $30^a$ and $30^b$ being interposed between the controller and sprocket-wheel 31. Shaft 16 is also connected (see Fig. 2) by toothed wheels 34 and 35 and chain 36 to a shaft 37, rotatably mounted on supports $37^a$ below platform or floor 10.

Shaft 23 has a horizontal screw-feed mechanism 38 rotatably mounted in a casing 39, with which a superposed hopper 40 communicates. At its end casing 39 communicates, by means of tube 41, with a scale-receptacle 42, supported from a framework comprising a lever 43, fulcrumed at 44 by the attachments 45, secured to opposite sides of the receptacle.

The outer end of lever 43 transmits its movement to a lower lever 46, pivoted at 47 by a connecting-link 48, which is hooked at its upper end to engage a ring 49, attached to lever 43. The other end of lever 46 is connected by a hooked link 52 to a scale-beam 50, Fig. 4, fulcrumed at 51, the scale-beam being of the usual type. At its outer end scale-beam 50 has an insulation-block 53, provided on its upper surface with two contacts 54 and 55, adapted to touch stationary contacts 56 and 57, respectively, when the beam is up. On its lower surface block 53 has a contact 58, adapted to touch stationary contact 59 when the beam is down. Scale-beam 50 is also equipped near its end with an electromagnet or solenoid 60, having a loop 61 attached to its core 62, encircling the beam, the function of the magnet when it is energized being to retain the scale-beam in its upmost position, with movable contacts 54 and 55 touching contacts 56 and 57. Shaft 26 is similarly supplied with a screw feed mechanism 63, casing 64, hopper 65, Fig. 3, and tube 66, communicating with scale-receptacle 67, which is connected to its scale-beam 68 in the same manner and by the same means that chamber 42 is connected to scale-beam 50. Beam 68 is supplied with a retaining-magnet 69 and with the insulated movable switch elements 70, 71, and 72, adapted to contact with elements 73, 74, and 75, respectively. In other words, the two scale mechanisms are precisely alike.

Each scale-receptacle 42 has an open mouth at its lower end controlled by a closure 76, pivoted thereto at 77 and connected to one arm of a suitably-supported bell-crank 78 by a rod 79. The other arms of the two bell-cranks are joined by a transverse rod 80, Fig. 3, connected to an upright rod 81, the upper end of which is attached to the core 82 of a discharge magnet or solenoid 83.

Below both chambers 42 and 67 is a hopper 84, leading to horizontal casing 85, within which is a screw feed device 86, actuated by shaft 37, whereby the discharges from the scales may be united and conveyed away from the machine.

The controller 29, conveniently mounted on a table or other support 87, Fig. 2, comprises a rotary insulation-drum 88, having on its cylindrical surface contacts 89, 90, 91, and 92, (shown developed in Fig. 5,) which are electrically connected together by conducting-strip 93. Fixed contacts 94, 95, 96, and 97 coöperate, respectively, with contacts 89, 90, 91, and 92, resting thereupon as the latter revolve.

The operation of the device is as follows: Assuming that the scale-receptacles are being filled, that the scale-beams 50 and 68 are down, and that motor 12 is revolving shafts 16, 23, and 26, the clutch 19 receiving current from positive main 98 through wire 99, fuse 100, main switch 101, conductors 102 and 103, contacts 58 and 59, and wire 104, the current returning to the negative main 109 by wires 105 and 106, switch 101, fuse 107, and wire 108, and clutch 20 receiving current through parts 99 100 101 102 103 mentioned above and wire 110, contacts 72 and 75, and conductor 111, the same returning by means of wire 112 and the parts 106, 101, 107, and 108 described above, the screws 38 and 63 will feed the contents of their respective hoppers into the scale-receptacles. When the required weight of the ingredient has been fed to receptacle 42, its scale-beam 50 rises, breaking the contact between switch elements 58 and 59, thereby rupturing the circuit through clutch 19, so that the latter becomes deënergized, causing a cessation of the rotation of shaft 23 and feed-screw 38. When beam 50 rises, it brings contacts 54 and 56 and 55 and 57 together, thereby closing a circuit from the negative main through wire 113, contacts 54 and 56, beam-solenoid 60, current-reducing incandescent lamps 60$^a$, wire 114, test-switch 115, wire 116, contacts 96 and 91, (the controller being in the 0 position,) strip 93, contacts 92 and 97, and wire 117 back to wire 102, which is connected to the positive main. The energization of solenoid 60 acts to retain the scale-beam 50 in its uppermost position, maintaining contact between switch elements 54 and 56 and 55 and 57.

When scale-receptacle 67 has received its proper amount of material, scale-beam 68 rises, separating contacts 72 and 75, thereby deënergizing clutch 20 and stopping the turning of shaft 26 and feed-screw 63. The rising of beam 68 brings contacts 70 and 73 and 71 and 74 together, so that solenoid 69 becomes energized and maintains the beam in its uppermost position. The circuit through solenoid 69 includes parts 108, 107, and 101, conductor 118, switch-contacts 70 and 73, solenoid 69, lamps 69$^a$, wire 119, and test-switch 115 to wire 116, which is connected, as set forth above, to main 98 through the controller.

The sizes of the sprocket-wheels 24 and 27 are so chosen that the screw feed mechanisms will advance the proper amounts of the ingredients into the scale-receptacle in the same interval of time, so that the scale-beams will both rise at substantially the same instant, and when this occurs an additional circuit is completed through controller-clutch 30, the energization of which causes the rotation of the controller in the direction indicated by the arrow in Fig. 5. This circuit includes the following parts: 99 100 101 102 103, contacts 55 and 57, connecting-wire 120, contacts 71 and 74, wire 121, test-switch 115, wire 122, clutch 30, and wire 106, which is connected to negative main 109.

At the time the controller has turned so as to bring it to position No. 1 under the stationary contacts a circuit is closed through discharge-magnet 83, including wires 102 and 117, contacts 97 and 92, strip 93, contacts 90 and 95, wire 123, solenoid or magnet 83 to wire 106, connected to the negative main. Magnet 83 thereupon becomes energized, lifts bell-cranks 78, and opens the discharge-mouths of receptacles 42 and 67 by drawing closures 76 to one side, whereby the contents of the receptacles are emptied at the same time into hopper 84, from which they are conveyed away by feed mechanism 86.

Simultaneously with the closure of the discharge-magnet circuit a shunt around contacts 55, 57, 71, and 74, which are in series, is closed by means of contact 94 engaging contact 89 of the controller, the shunt about the contacts including wire 117, contacts 97 and 92, strip 93, contacts 89 and 94, and wire 124. This shunt-circuit maintains a continuous flow of current through controller-clutch 30, even though a momentary separation of contacts 55 and 57 or 71 and 74 is occasioned by the discharging operation. The circuits remain in this condition until the controller reaches position No. 6, whereupon the discharge-magnet circuit is opened, the receptacles in the meantime having emptied their contents into the common hopper 84. At position No. 7 of the controller the shunt and beam solenoid-circuits become broken and the scale-beams drop, opening the circuit through clutch-magnet 30, and the controller stops at position 0, where it remains until both scale-beams are again raised. The dropping of the scale-beams again closes the circuits through the clutches 19 and 20, and the feeding and discharging operation is repeated.

It will be observed that by inclosing the scale-beams in a housing or casing 125, which may be locked, the control of the mechanism is taken away from the operator, so that a compound including the proper amounts of ingredients is insured.

It will be apparent that the number and amounts of the ingredients may be varied by using a corresponding number of scales and coöperating parts and by placing the proper weights on the scale-beams.

Other minor mechanical changes may be incorporated in the structure without departing from the substance of our invention as defined by the appended claims.

We claim—

1. In a device of the character described, the combination of a scale, an electric switch actuated by the scale-beam, and a magnet in circuit with said switch to maintain said scale-beam in elevated position when the beam moves to close said switch, substantially as described.

2. In a device of the character described, the combination of a plurality of scales, an electric switch for each scale, each switch being closed by its scale when the latter has received a definite amount of material to be weighed, an electric controller, an electrically-actuated device controlling the operation of said controller, all of said switches being in series in the circuit of said electrically-actuated device, whereby the latter cannot become energized until all the scales have closed their switches, substantially as described.

3. In a device of the character described, the combination of a plurality of scales, an electric switch for each scale, each switch being closed by its scale when the latter has received a definite amount of material to be weighed, an electric controller, an electromagnetic clutch controlling the operation of said controller, all of said switches being in series in the circuit of said clutch, whereby the latter cannot become energized until all the scales have closed their switches, substantially as described.

4. In a device of the character described, the combination of a plurality of scales each equipped with an electric switch which the scale operates when the latter has received a predetermined amount of material to be weighed, and an electromagnet controlling the discharge from the receptacles of said scales, said switches controlling the operation of said electromagnet, substantially as described.

5. In a device of the character described, the combination of a plurality of scales each equipped with an electric switch, which the scale operates when the latter has received a predetermined amount of material to be weighed, an electromagnet controlling the discharges from the receptacles of said scales, an electrically-actuated device controlling the circuit of said electromagnet, said switches being in series in the circuit of said electrically-actuated device, substantially as described.

6. In a device of the character described, the combination of a plurality of scales each equipped with an electric switch which becomes closed when its scale-receptacle has received a predetermined weight of material to be weighed, an electric controller, an electrically-actuated device controlling the operation of said controller, said switches being in series in the circuit of said electrically-actuated device, and a shunt-circuit around said switches controlled by said controller, substantially as described.

7. In a device of the character described, the combination of a plurality of scales each equipped with a scale-beam and a scale-receptacle, each scale-beam having two switches which are closed when the beam rises, an electromagnet for each scale-beam to retain the latter in its uppermost position when the electromagnet is energized, each electromagnet being in circuit with one of said switches, a discharge-magnet for simultaneously discharging the contents of said scale-receptacles, an electromagnetic device controlling the circuit of said discharge-magnet, the other switches of said scale-beams being in series in the circuit of said electromagnetic device, substantially as described.

8. In a device of the character described, the combination of a plurality of scales, each equipped with a scale-beam and a scale-receptacle, a feed mechanism for each scale for advancing material into its scale-receptacle, a magnetic clutch for each feed mechanism controlling the operation thereof, an electric switch in the circuit of each magnetic clutch, said switch being closed when its corresponding scale-beam is down and opened when its scale-beam rises, whereby each feed mechanism operates to deliver material to its scale-receptacle until a predetermined weight sufficient to raise the scale-beam has been fed thereto, each scale-beam being provided with a magnet to retain it in uppermost position, a switch actuated by each scale-beam controlling the circuit of said retaining-magnet, other switches actuated by each scale-beam respectively, a discharge-magnet to simultaneously empty said receptacles, an electrically-actuated device controlling the circuit of said discharge-magnet, said last-named switches being in series in the circuit of said electrically-actuated device, substantially as described.

WILLIAM T. DEAN.
JOHN G. BERGQUIST.

Witnesses:
FREDERICK C. GOODWIN,
W. M. FULLER.